(12) United States Patent
Cotter

(10) Patent No.: US 9,769,231 B1
(45) Date of Patent: Sep. 19, 2017

(54) QOS FOR ADAPTABLE HTTP VIDEO

(71) Applicant: ARRIS Group, Inc., Suwanee, GA (US)

(72) Inventor: Tony John Cotter, Ballingcollig (IE)

(73) Assignee: ARRIS Enterprises LLC, Suwanee, GA (US)

( * ) Notice: Subject to any disclaimer, the term of this patent is extended or adjusted under 35 U.S.C. 154(b) by 413 days.

(21) Appl. No.: 14/037,752

(22) Filed: Sep. 26, 2013

Related U.S. Application Data

(62) Division of application No. 13/433,493, filed on Mar. 29, 2012, now abandoned.

(60) Provisional application No. 61/446,862, filed on Apr. 1, 2011.

(51) Int. Cl.
| | |
|---|---|
| *H04N 7/173* | (2011.01) |
| *H04L 29/06* | (2006.01) |
| *H04N 21/222* | (2011.01) |
| *H04N 21/238* | (2011.01) |
| *H04N 21/236* | (2011.01) |
| *H04N 21/2385* | (2011.01) |
| *H04N 7/16* | (2011.01) |

(52) U.S. Cl.
CPC ........... *H04L 65/60* (2013.01); *H04N 21/222* (2013.01); *H04N 21/2221* (2013.01); *H04N 21/2385* (2013.01); *H04N 21/23614* (2013.01); *H04N 21/23805* (2013.01)

(58) Field of Classification Search
CPC .. H04L 65/60; H04N 21/222; H04N 21/2221; H04N 21/23; H04N 21/23103; H04N 21/2343; H04N 21/23611; H04N 21/23614; H04N 21/2365; H04N 21/23655; H04N 21/2368; H04N 21/238; H04N 21/23805; H04N 21/2385; H04N 21/2402
USPC .................. 725/95; 370/395.43, 395.61
See application file for complete search history.

(56) References Cited

U.S. PATENT DOCUMENTS

| | | | |
|---|---|---|---|
| 6,665,872 B1 * | 12/2003 | Krishnamurthy .. | H04N 21/2365 375/240.26 |
| 8,040,894 B2 | 10/2011 | Jones | |
| 8,128,503 B1 * | 3/2012 | Haot ....................... | A63F 13/12 375/E7.006 |
| 2006/0187925 A1 * | 8/2006 | Brune ..................... | H04L 29/06 370/389 |
| 2008/0075163 A1 * | 3/2008 | Brydon ................ | H04N 19/196 375/240.02 |
| 2008/0285571 A1 * | 11/2008 | Arulambalam ... | H04L 29/06027 370/400 |
| 2009/0019509 A1 | 1/2009 | Horn et al. | |
| 2009/0190653 A1 * | 7/2009 | Seo ........................ | H04N 5/765 375/240.01 |
| 2011/0035772 A1 | 2/2011 | Ramsdell et al. | |
| 2011/0099595 A1 * | 4/2011 | Lindquist .......... | H04N 21/4383 725/105 |

(Continued)

*Primary Examiner* — Pankaj Kumar
*Assistant Examiner* — Reuben M Brown
(74) *Attorney, Agent, or Firm* — Stewart M. Wiener

(57) ABSTRACT

Systems and methods can operate to manage the shared network bandwidth usage for media content streams. Through the bandwidth management of an individual media content stream while taking other media content streams into account a media stream server can achieve a stable bit rate across all streams to improve the quality of experience (QoE) of media content streams displayed at client devices.

18 Claims, 5 Drawing Sheets

(56) References Cited

U.S. PATENT DOCUMENTS

| | | | |
|---|---|---|---|
| 2011/0228673 A1* | 9/2011 | Grayson | H04L 47/10 370/232 |
| 2012/0106336 A1 | 5/2012 | Han | |
| 2012/0250646 A1 | 10/2012 | Rubin et al. | |
| 2013/0007263 A1* | 1/2013 | Soroushian | H04L 47/12 709/224 |
| 2013/0132986 A1* | 5/2013 | Mack | H04L 65/605 725/14 |
| 2014/0072058 A1* | 3/2014 | Zu | H04N 19/44 375/240.25 |

* cited by examiner

QOS FOR ADAPTABLE HTTP VIDEO

RELATED APPLICATIONS

This application claims priority as a divisional application of U.S. patent application Ser. No. 13/433,493, entitled "QoS for Adaptable HTTP Video," filed Mar. 29, 2012, which is a non-provisional of U.S. Provisional Patent Application Ser. No. 61/446,862, entitled "QoS for Adaptable HTTP Video," filed Apr. 1, 2011, both of which are incorporated herein by reference in their entirety.

TECHNICAL FIELD

This disclosure relates to improved systems and methods for controlling and coordinating the network bandwidth made available to a plurality of hypertext transport protocol (HTTP) streaming sessions.

BACKGROUND

A media stream server can provide a plurality of media content streams (e.g., video) to a plurality of client devices over a shared network connection. In some implementations, the media stream server can adjust the network bandwidth allocated to one or more media content streams to obtain a stable bit rate enabling uninterruptable media content playback on one or more client devices. The media stream server can decrease the bit rate of the media content streams associated with client devices when available network bandwidth reduces. In some implementations the client devices can buffer the media content stream to absorb network bandwidth fluctuations avoiding encoding adaption by the client devices.

In some implementations, the media stream server can allocate available network bandwidth to achieve a stable bit rate for media content streams for each client device independently on the shared network. However, the allocation of network bandwidth between individual media content streams can be are uncoordinated and can result in random bit rate fluctuations and can result in a poor quality of experience (QoE) at the client devices. In other implementations the media stream server can manage shared network bandwidth usage for individual media content streams by taking other media content streams into account to achieve a stable media content stream bit rate for the plurality of media content streams.

BRIEF DESCRIPTION OF THE DRAWINGS

Like reference numbers and designations in the various drawings indicate like elements.

DETAILED DESCRIPTION

In some implementations of this disclosure, methods, systems, and apparatus can manage the shared network bandwidth for individual media content streams where the shared network bandwidth requirements of other media content streams are taken into account. A media stream server can grant fixed amounts of bandwidth to each media content stream irrespective of the current shared network bandwidth in order to prevent each stream from adapting its bit rate. The media stream server can initially set the target bit rate of a media content stream to slightly above the current measured average bit rate of the media content stream and can then prevent player-initiated bit rate changes by adjusting that target bit rate slightly in response to a measurement of periods of inactivity (i.e., quiet time) with the aim of maintaining a short period of inactivity on average. The media stream server can also force bit rate changes in a media content stream by modifying the target bit rate of a media content stream to a value that can be expected to be appropriate for the next level up or down for an individual media content stream.

Figure 1:
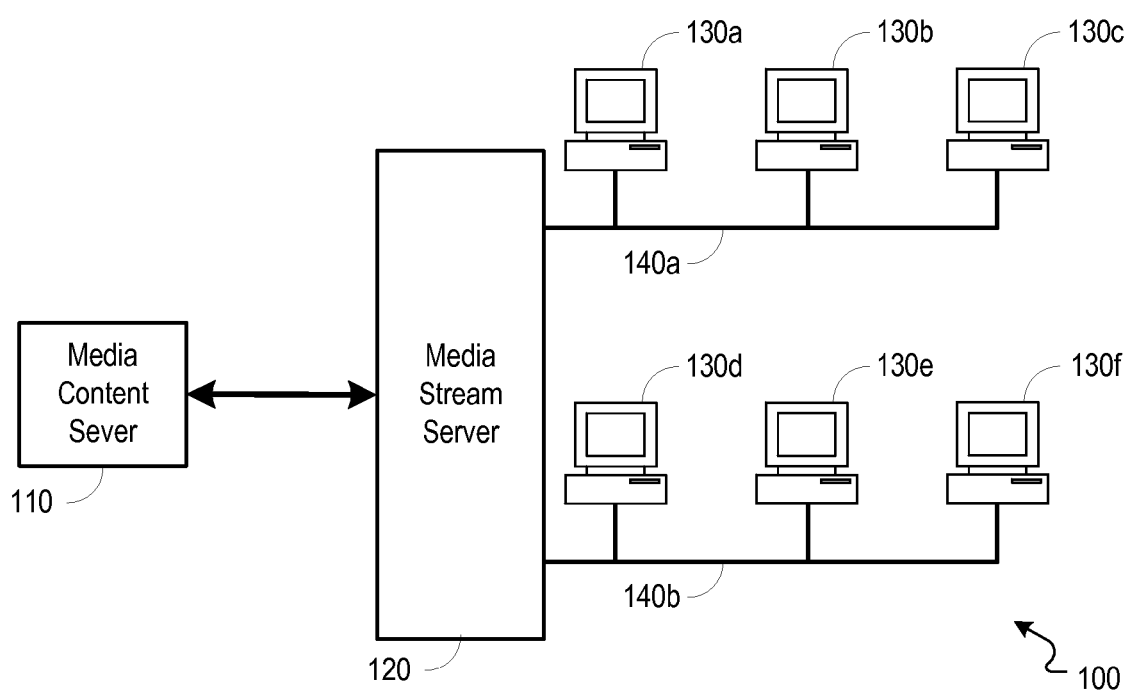
FIG. 1 is a block diagram illustrating an example network environment operable to manage the bit rate of media content streams.

FIG. 1 is a block diagram illustrating an example network environment operable to manage the bit rate of media content streams. The media content server 110 can provide media content to media streaming server 120. In some implementations, media content server 110 can be directly connected to media streaming server 120. In other implementations, a network can be used to connect media content server 110 to media streaming server 120. In another implementation, the media content server 110 can be integrated in the media stream server 120. Media server 120 can cache media content for media content stream delivery to client devices 130a-e.

Client devices 130a-c can be connected to media stream server 120 through shared network 140a and client devices 130d-e can be connected to the media stream server 120 through shared network 140b. In some implementations, networks 140a-b can be physically distinct from each other and can transport streaming media content to client devices 130a-c and 130d-f respectively through a downstream communications path (e.g., channel). Client devices 130a-c can share a downstream communications path on network 120a and client devices 130d-f can share a separate downstream communications path on network 140b. In other implementations, networks 140a-b can represent separate downstream communication paths on the same physical network (not shown). In another implementation, client devices 130a-c can share one or more shared downstream communication paths (e.g., channel bonding) on network 140a. Networks 140a-b can be based on CATV data over cable service interface specification (DOCSIS) based, wireless (e.g., 3G/4G, 802.11, 802.16), fiber to the curb (FTTC) or fiber to the premise (FTTP) access networks.

Figure 2A:
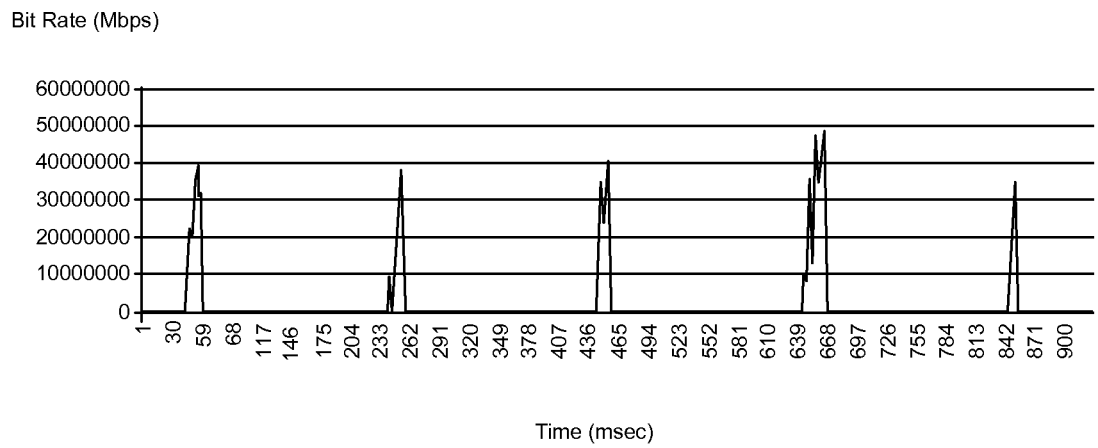
FIGS. 2A and 2B illustrate and examples of bit rate profile associated with HTTP responses for media content streams.

FIG. 2A illustrates an example bit rate profile associated with HTTP transactions for media content streams. In some implementations a client device(s) (e.g., client devices 130a-f of FIG. 1) can receive a burst of one or more HTTP response packets from the media stream server (e.g., media stream server 120 of FIG. 1) in response to an HTTP request. In an unconstrained (e.g., no traffic shaping) shared network (e.g., network 140a or 140b of FIG. 1), HTTP responses appear as a bit rate spike in reply to a HTTP request. The percentage of time where packets are not flowing for a given time interval can be referred to as a quiet time. In some implementations, the media stream server can measure the time interval between bursts of packet transmissions and calculate the quiet time. A burst of packet transmissions can be a sequence of packets which have a short time interval between successive packets compared to the time between successive bursts of packet transmissions. FIG. 2A illustrates a quiet time of approximately ninety percent.

Figure 2B:
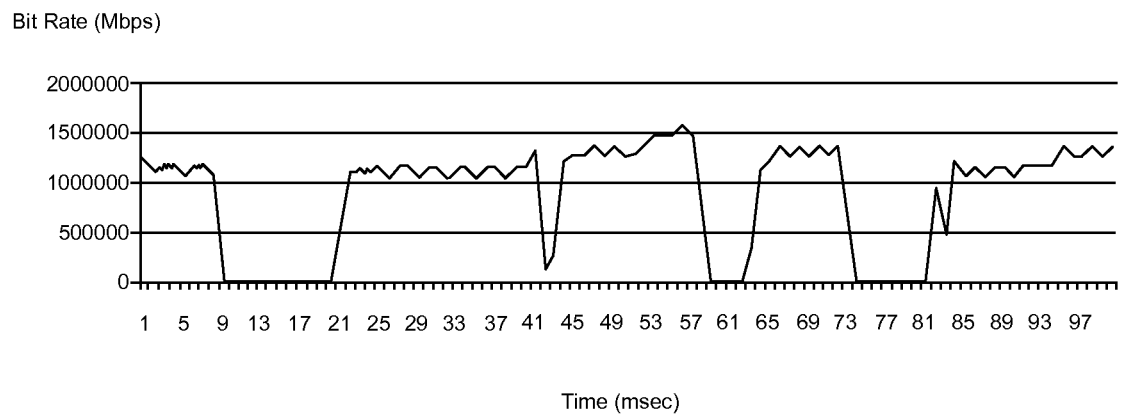

FIG. 2B illustrates an example bit rate profile associated with HTTP responses for media content streams wherein the quiet period can be approximately ten to twenty percent. The quiet time can vary due to the variable bit rate (VBR) characteristics of a media content stream. The bit rate of a media content stream can be close to a media content stream player client device's (e.g., client device(s) 130a-f of FIG. 1) bit rate threshold, the player can adapt its media content stream requests up or down around a bit rate threshold in response to minor variations in media content stream bit rates. In some implementations, the media stream server (e.g., media stream sever 120 of FIG. 1) can reduce the quiet time period by decreasing the allowed bit rate of a media content stream subject to a limited deviation. Through adjusting the bit rate of a media content stream with limited deviation the media stream server can lock a media content stream to a specific encoding bit rate and minimize player rate adaptations. FIG. 2B represents a locked media content stream illustrating a larger quiet time duration between the first two HTTP responses and a smaller quiet time duration before the next HTTP response.

Figure 3:
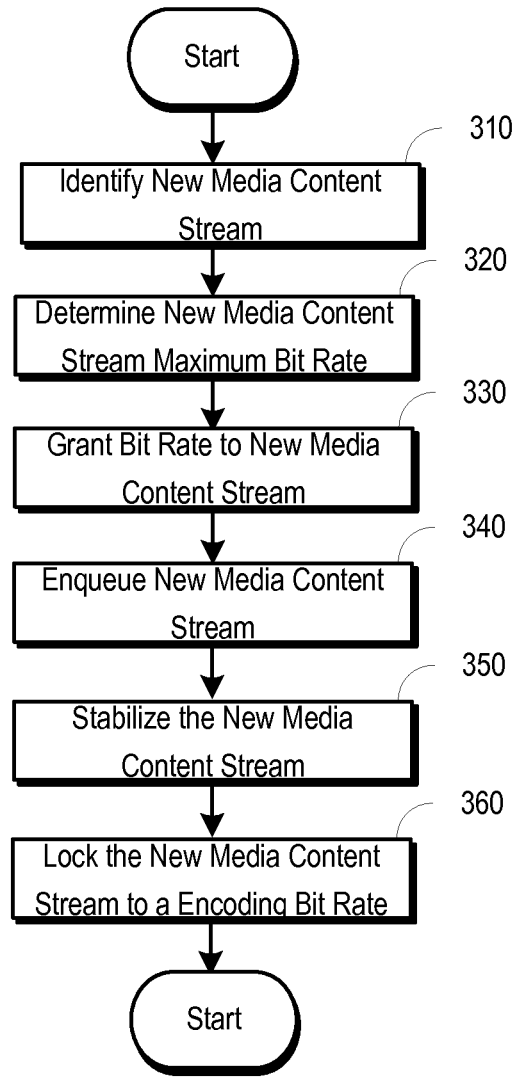
FIG. 3 is a flow chart illustrating an example process for adding media content streams.

FIG. 3 is a flow chart illustrating an example process 300 for adding media content streams. The various stages of the process 300 can be performed, for example, by one or more device processors in conjunction with program code operable to perform the respective features.

At stage 310, a new media content stream can be identified. The media stream server (e.g., media stream server 120 of FIG. 1) can identify the packets for individual media content streams. In some implementations, an individual media content stream can be identified by an internet protocol (IP) destination address and transport control protocol (TCP) port number or through other information in the packet header. In other implementations, the identification of an individual media content stream can be determined through inspection of HTTP packet payload information. In another implementation the media stream server can associate audio and video streams that can be transported through separate HTTP transactions.

At stage 320, the maximum bit rate for the new media content stream can be determined. The maximum bit rate of the new media content stream can be a predetermined constant or configured dynamically. In some implementations, the media content server (e.g., media content server 110 of FIG. 1) can overwrite one or more fields in each packet header associated with a media content stream with information indicating the current bit rate, the maximum bit rate, which one of the several bit rates can be in use by this packet or all of the packets. In some implementations, the media stream server (e.g., media stream server 120 of FIG. 1) can determine the maximum bit rate the new media content stream through information included in the packet header of the new media content stream. In other implementations, the media stream server can determine the maximum bit rate of a new media content stream through tracking HTTP responses. In another implementation, the media stream server can determine the maximum bit rate of a new media content stream through monitoring the bit rate of the constrained new media content stream over a period of time.

At stage 330, the bit rate for the new media content stream can be granted. The media stream server (e.g., media stream server 120 of FIG. 1) can grant a fixed bit rate to the new media content stream. In some implementations, the media content stream can grant a fixed bit rate to the new media content stream that can be less than the identified maximum bit rate of the new media content stream. Additionally, the sum of the maximum bit rates for each active media content stream can be greater than spare network capacity.

At stage 340, the new media content stream can be enqueued. The media stream server (e.g., media stream server 120 of FIG. 1) can enqueue the new media content stream in a unique queue.

At stage 350, the new media content stream traffic can be stabilized. The media stream server (e.g., media stream server 120 of FIG. 1) can shape new media content stream packets to conform to a fixed bit rate by delaying the transmission of one or more enqueued new media content stream packets. In some implementations, the media stream server can implement a token bucket algorithm, well known by those skilled in the art, to stabilize or shape a new media content stream to a fixed bit rate.

At stage 360, the new media content stream can be locked to a specific encoding bit rate. A media content stream can have a variable bit rate that can average out over a time period. In some implementations, the media stream server (e.g., media stream sever 120 of FIG. 1) can monitor and determine the quiet time (e.g., quiet time of FIGS. 2A and 2B) over a time period for a new media content stream. The media stream server can adjust the fixed bit rate of the new media content stream to a measured average bit rate of the new media content stream to lock the new media content stream to a specific encoding bit rate.

In some implementations, the media stream server (e.g., media stream server 120 of FIG. 1) can force bit rate changes in media content streams. The media stream content players of client device(s) (e.g., client devices 130a-f of FIG. 1) can be forced to change their bit rate requirements. The media stream server can force bit rate adaption downwards through measuring the current average bit stream of a media content stream and reducing the fixed bit rate. Alternatively, the media stream server can force bit rate adaption upward through measuring the current average bit stream and increasing the shaped fixed bit rate. In both cases, the media stream content players of the client device will eventually adapt and settle at a revised bit rate.

Figure 4:
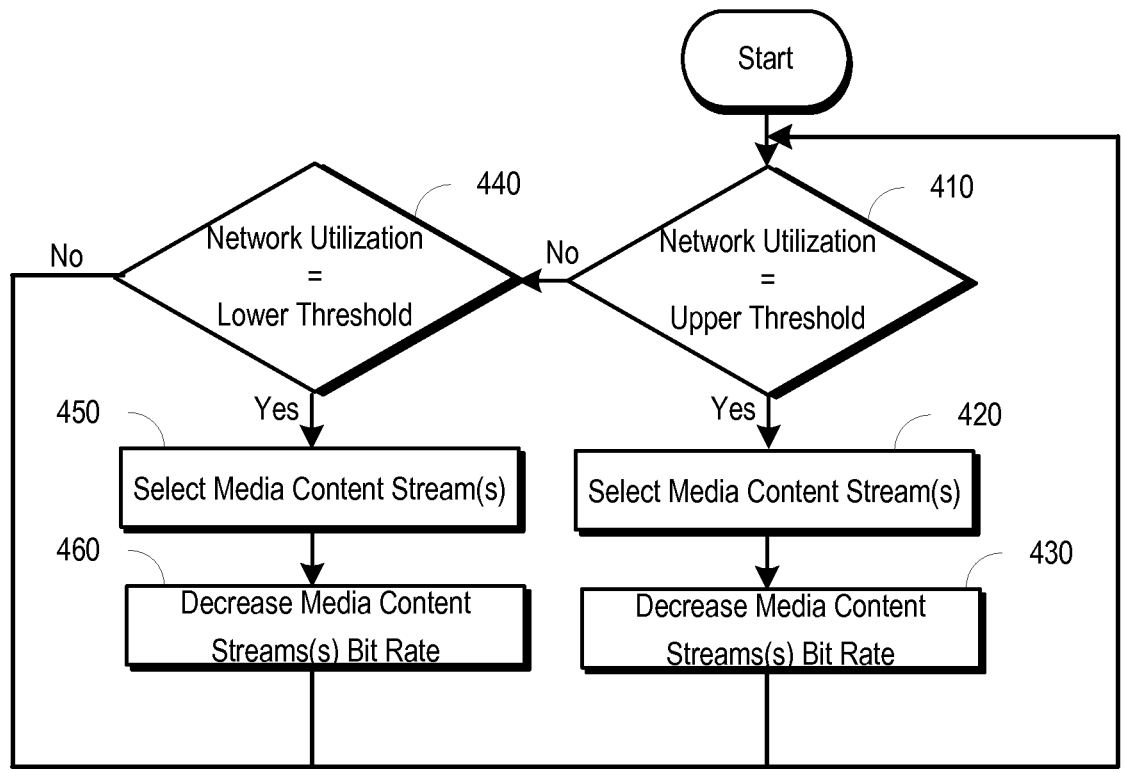
FIG. 4 is a flow chart illustrating the management of network utilization for media content streams.

FIG. 4 is a flow chart illustrating the management of network utilization for media content streams. The network (e.g., network 140a and 140b of FIG. 1) bandwidth utilization for one or more media access streams can change over time through the addition, removal and rate adaptation of media content streams. In some implementations, the media stream server (e.g., media stream server 120 of FIG. 1) can set upper and lower network bandwidth utilization thresholds.

At stage 410, a determination can be made if the network bandwidth utilization meets an upper threshold. If an upper threshold is not reached process 400 proceeds to stage 440. If the upper threshold is reached process 400 proceeds to stage 420. In some implementations, the media stream server (e.g., media stream server 120 of FIG. 1) can determine if the network bandwidth utilization of the media content streams meets an upper threshold.

At stage 420, one or more media content stream(s) are selected. In some implementations, the media stream server (e.g., media stream server 120 of FIG. 1) can select one or more streams for bit rate modification. In some implementations, the media stream server can select a different media content stream(s) each time a bit rate modification can be required such that the same client device(s) (e.g., client devices 130a-f) media content stream player(s) are not required to rate adapt. In some implementations, a round robin algorithm can be used for the selection of media content streams.

At stage 430, the bit rate of one or more media content(s) are decreased. In some implementations, the media stream server (e.g., media stream server 120 of FIG. 1) can force the bit rate of one or more media content streams downward. Process 400 proceeds to stage 410 where the network utilization can be continually monitored.

At stage 440, a determination can be made the network bandwidth utilization meets a lower threshold. If a lower threshold is not reached process 400 proceeds to stage 410 where the network utilization can be continually monitored. If the lower threshold is reached process 400 proceeds to stage 450. In some implementations, the media stream server (e.g., media stream server 120 of FIG. 1) can determine if the network bandwidth utilization of the media content streams meets a lower threshold.

At stage 450, one or more media content stream(s) are selected. In some implementations, the media stream server (e.g., media stream server 120 of FIG. 1) can select one or more streams for bit rate modification. In some implementations, the media stream server can select a different media content stream(s) each time a bit rate modification can be required such that the same client device(s) (e.g., client devices 130a-f) media content stream player(s) are not required to rate adapt. In some implementations, a round robin technique can be used for the selection of media content streams.

At stage 460, the bit rate of one or more media content(s) are increased. In some implementations, the media stream server (e.g., media stream server 120 of FIG. 1) can force the bit rate of one or more media content streams upward. Process 400 proceeds to stage 410 where the network utilization can be continually monitored.

Figure 5:
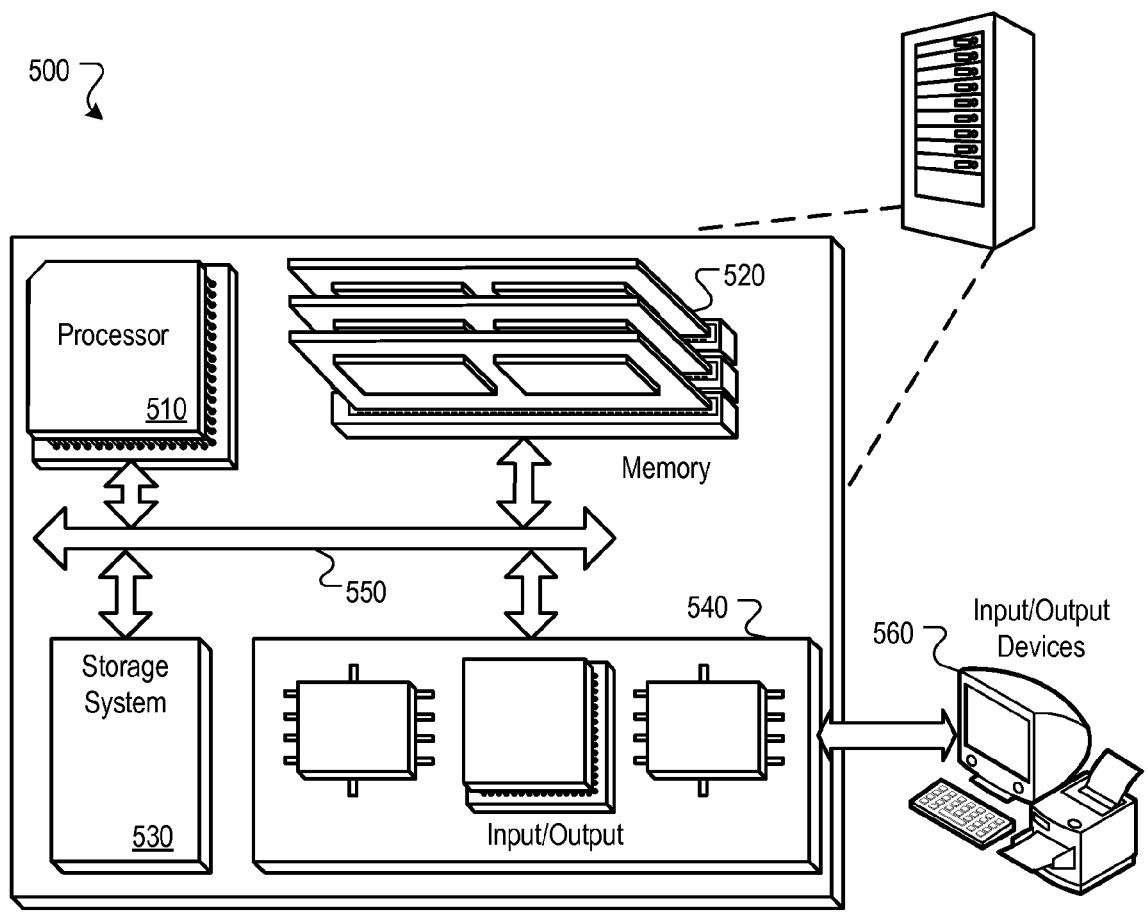
FIG. 5 is a block diagram illustrating an example of a media stream server operable to manage media content streams.

FIG. 5 is a block diagram illustrating a media stream server 500 (e.g., media stream server 120 of FIG. 1) operable to manage bit rates of media content streams. The network attached processor based system 500 can include a processor 510, a memory 520, a storage device 530, and an input/output device 540. Each of the components 510, 520, 530, and 540 can, for example, be interconnected using a system bus 450. The processor 510 is capable of processing instructions for execution within the media stream server system 500. In one implementation, the processor 510 is a single-threaded processor. In another implementation, the processor 510 is a multi-threaded processor. The processor 510 is capable of processing instructions stored in the memory 520 or on the storage device 530. The processor 510 can be a complex of one or more processors.

The memory 520 stores information within the network attached processor based system 500. The memory 520 is a computer-readable medium. In various implementations, the memory 520 can include a volatile memory unit, a non-volatile memory unit, or combinations thereof.

In some implementations, the storage device 530 is capable of providing mass storage for network attached processor based system 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the network attached processor based system 500. In one implementation, the input/output device 540 can include one or more interfaces for enabling communication through DOCSIS based, 3G/4G, 802.11, 802.16, FTTC, or (FTTP) access networks. In another implementation, the input/output device can include driver devices configured to receive input data and send output data to other input/output devices, such as one or more computers as well as sending communications to, and receiving communications from a network (not shown). Other implementations, however, can also be used, such as mobile computing devices, mobile communication devices, set-top box television client devices, etc.

The communications device (e.g., cable modem, set top box, media terminal adapter, mobile phones, tablet computers, personal computers, personal digital assistances, etc.) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method for management of network utilization for media content streams, the method comprising:
   in a media content server comprising one or more processors:
   identifying a new media content stream,
   determining a maximum bit rate to associate with the new media content stream, and
   in each of a plurality of packet headers associated with the new media content stream, overwriting one or more data fields with information comprising an indicator for the maximum bit rate; and
   in a media stream server communicatively coupled to the media content server:
   granting a fixed network bandwidth to the new media content stream, in a network coupled to the media stream server for content delivery to a plurality of client devices, by allocating a fixed bit rate to the new media content stream based on the one or more data fields,
   enqueuing the new media content stream in a queue for transmission via the network,
   stabilizing network traffic of the new media content stream based on the granted fixed network bandwidth, and
   adjusting the fixed bit rate of the new media content stream to a locked encoding bit rate based on a measured average associated with the granted fixed network bandwidth.

2. The method of claim 1, wherein the new media content stream is identified through information in one or more packets each comprising a packet header.

3. The method of claim 2, wherein the packet header comprises an IP destination address and a TCP port number.

4. The method of claim 1, wherein the new media content stream is based on HTTP.

5. The method of claim 4, wherein separate audio and video HTTP transactions associated with the same content is identified.

6. The method of claim 1, wherein the maximum bit rate is determined by information in a packet header.

7. The method of claim 1, wherein the maximum bit rate is determined by monitoring HTTP transactions.

8. The method of claim 1, wherein bit rates of one or more active media content streams are used to determine the fixed bit rate.

9. The method of claim 1, wherein the fixed bit rate is less than the maximum bit rate of the new media content stream.

10. The method of claim 1, wherein the sum of the fixed bit rates granted to one or more media content stream is greater than spare network capacity.

11. The method of claim 1, wherein a unique queue is associated with the new media content stream.

12. The method of claim 1, wherein a token bucket algorithm is used to stabilize the new media content stream.

13. The method of claim 1, wherein the media stream server is operable to cache the new media content stream.

14. The method of claim 1, wherein the network comprises one of a DOCSIS-based network, a 3G network, a 4G network, an 802.11-based network, an 802.16-based network, a fiber to the curb (FTTC) access network, and a fiber to the premises (FTTP) access network.

15. A system for management of network utilization for media content streams, comprising:
- a media content server comprising one or more processors, the media content server configured to perform steps of:
  - identifying a new media content stream,
  - determining a maximum bit rate to associate with the new media content stream, and
  - in each of a plurality of packet headers associated with the new media content stream, overwriting one or more data fields with information comprising an indicator for the maximum bit rate; and
- a media stream server comprising one or more processors, the media stream server communicatively coupled to the media content server, and configured to perform steps of:
  - granting a fixed network bandwidth to the new media content stream, in a network coupled to the media stream server for content delivery to a plurality of client devices, by allocating a fixed bit rate to the new media content stream based on the one or more data fields,
  - enqueuing the new media content stream in a queue for transmission via the network,
  - stabilizing network traffic of the new media content stream based on the granted fixed network bandwidth, and
  - adjusting the fixed bit rate of the new media content stream to a locked encoding bit rate based on a measured average associated with the granted fixed network bandwidth.

16. The system of claim 15, wherein the media stream server is further configured to cache the new media content stream.

17. The system of claim 15, wherein the new media content stream is identified through information in one or more packets each comprising a packet header.

18. The system of claim 15, wherein the network comprises one of a DOCSIS-based network, a 3G network, a 4G network, an 802.11-based network, an 802.16-based network, a fiber to the curb (FTTC) access network, and a fiber to the premises (FTTP) access network.

* * * * *